United States Patent [19]

Wickramanayake

[11] Patent Number: 5,565,022

[45] Date of Patent: Oct. 15, 1996

[54] FAST DRYING, BLEED-FREE INK-JET INK COMPOSITIONS

[75] Inventor: Palitha Wickramanayake, Corvallis, Oreg.

[73] Assignee: Hewlett-Packard Company, Palo Alto, Calif.

[21] Appl. No.: 528,072

[22] Filed: Sep. 14, 1995

[51] Int. Cl.$^6$ .................................................. C09D 11/02
[52] U.S. Cl. .................... 106/22 R; 106/22 H; 106/20 D
[58] Field of Search ............................ 106/22 R, 22 H, 106/20 D

[56] References Cited

U.S. PATENT DOCUMENTS

| 5,106,416 | 4/1992 | Moffat et al. ................. 106/22 R |
| 5,116,409 | 5/1992 | Moffatt ............................ 106/20 R |
| 5,133,803 | 7/1992 | Moffatt ............................ 106/25 R |
| 5,226,957 | 7/1993 | Wickramanayake et al. ... 106/25 R |

Primary Examiner—Helene Klemanski

[57] ABSTRACT

Ink-jet ink compositions are provided which exhibit fast dry times and bleed-free prints when printed onto a print medium so that the throughput of an ink-jet printer may be increased. The ink compositions of the invention comprise (a) at least one dye; (b) at least one high-boiling, water-insoluble organic compound; (c) at least one amphiphile; and (d) water. The dye may be either water-soluble or water-insoluble and the high boiling organic compound has a vapor pressure low enough such that only water evaporates from the ink during normal printing operations. The amphiphile is present in an amount sufficient to solubilize the water-insoluble organic compound in the water. Preferably, the amphiphile belongs to a class of compounds known as hydrotropes.

20 Claims, 1 Drawing Sheet

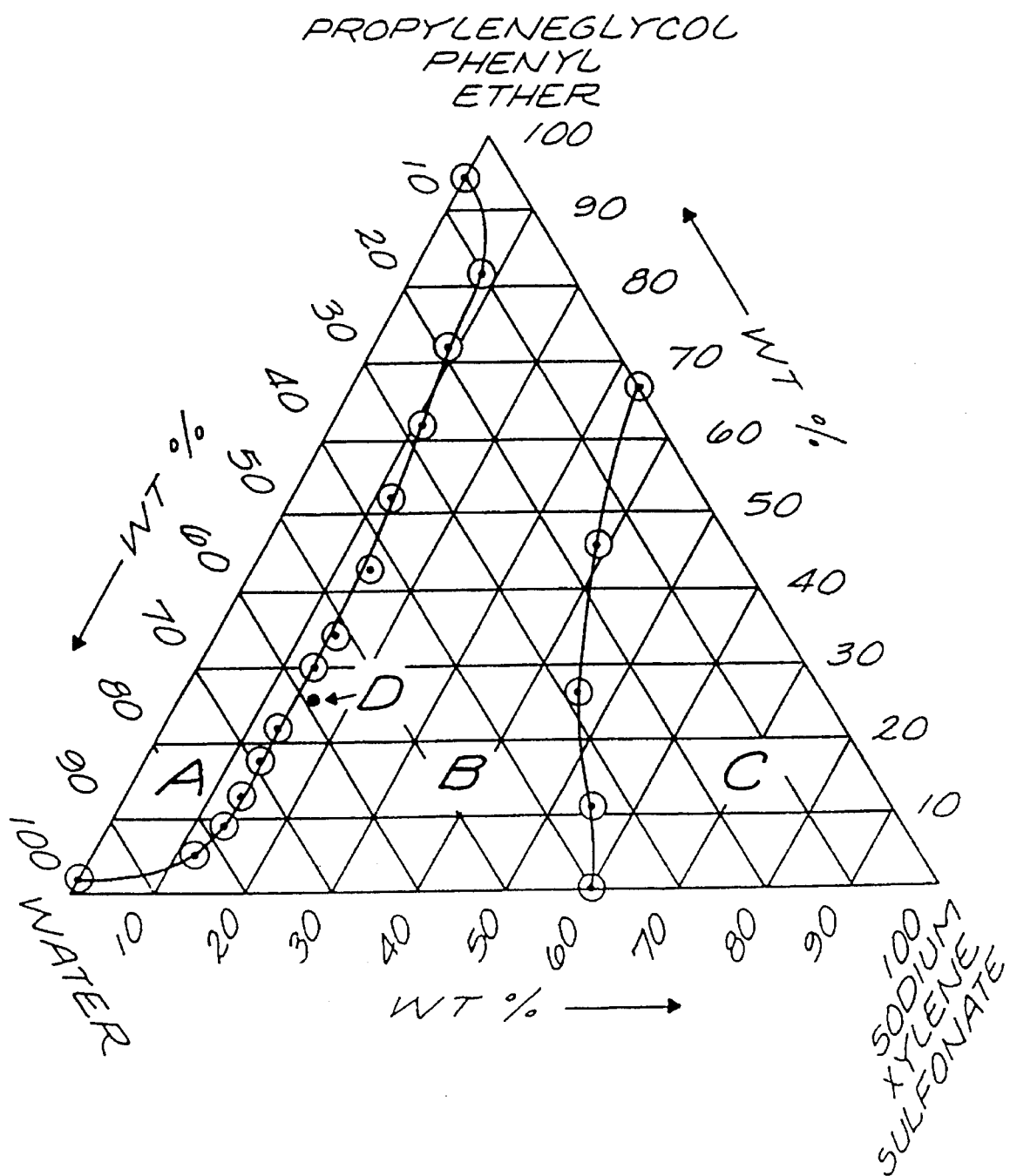

FAST DRYING, BLEED-FREE INK-JET INK COMPOSITIONS

CROSS-REFERENCE TO RELATED APPLICATION

The present application is related to application Ser. No. 08/528,077, filed concurrently herewith [PD-191644-1]. That application is directed to bleed control of pigment-based thermal ink-jet compositions with retention of waterfastness.

TECHNICAL FIELD

The present invention relates to ink compositions employed in ink-jet printing, and, more particularly, to ink-jet ink compositions having substantially reduced dry times and yielding bleed-free prints.

BACKGROUND ART

Ink-jet printing is a non-impact printing process in which droplets of ink are deposited on print media, such as paper, transparency film, or textiles, in response to an electrical signal. In thermal ink-jet printing, a resistor element in a chamber is supplied with ink via a plenum, which is connected to an ink reservoir. A plurality of such resistor elements are arranged in a particular pattern in the printhead of an ink-jet print cartridge. Each resistor element is associated with a nozzle in a nozzle plate. In operation, each resistor element is connected to a microprocessor, whose signals direct one or more resistor elements to heat up rapidly. The heat creates a vapor bubble in the chamber, which expels ink through the associated nozzle onto the print medium. The firing of a plurality of such resistor elements in a particular order forms alphanumeric characters, area fills, and other patterns on the print medium. In piezoelectric ink-jet printing, ink droplets are ejected due to the vibrations of piezoelectric crystals, again, in response to electrical signals generated by the microprocessor.

Ink-jet printers offer low cost, high quality printing with relatively noise-free operation. As such, ink-jet printers have become a popular alternative to other types of printers used with computers, such as the more expensive laser printers. However, ink-jet printers are presently incapable of matching the level of throughput generated by laser printers due in large part to the relatively slow dry time of ink-jet inks as well as to printer slow-down deriving from the resident bleed control algorithms in the printer. With particular regard to bleed control, there is a tendency among ink-jet inks to bleed into one another when printed in various colors on paper substrates. Bleed occurs as colors mix both on the surface of the paper substrate as well as within the substrate itself. In response to this problem, ink-jet primers commonly employ bleed control algorithms in an attempt to provide a border between colors that is clean and free from the invasion of one color into another; however, this slows down the primer. In order to increase the level of throughput generated by ink-jet primers, the dry time of ink-jet inks should be improved, preferably in a manner that also effects bleed control.

Various solutions to improve the dry time of ink-jet inks have been proffered. Some solutions involve changing the ink environment to hasten dry time. For example, heated platens and other heat sources have been employed to achieve faster dry times. However, heated platens add cost to the primer, which is generally not cost effective.

Other solutions involve adding various components to the ink-jet ink composition to achieve fast dry times. For example, surfactants have been added to dyebased ink-jet ink compositions to improve dry time by increasing the penetration rate of the ink into the paper; see, e.g., U.S. Pat. No. 5,106,416 entitled "Bleed Alleviation Using Zwitterionic Surfactants and Cationic Dyes", issued to John Moffatt et al; U.S. Pat. No. 5,116,409 entitled "Bleed Alleviation in Ink-Jet Inks", issued to John Moffatt; and U.S. Pat. No. 5,133,803 entitled "High Molecular Weight Colloids Which Control Bleed", issued to John Moffatt, all assigned to the same assignee as the present application. Notably, bleed control is also achieved with the addition of surfactants. Although increasing the penetration rate of the ink reduces its dry time, an undesirable reduction in edge acuity may also result from the addition of surfactants. Moreover, the addition of surfactants to ink-jet inks is known to negatively affect drop ejection characteristics. More particularly, the low surface tensions of surfactant-containing inks could cause puddles on the nozzle plates of the printhead, leading to poor drop ejection characteristics. Short-chain alcohols have also been added to ink-jet ink compositions to hasten dry times, but, depending upon the particular print medium, the addition of short-chain alcohols may adversely affect print quality due to increased edge roughness. Thus, the improved dry times achieved with the addition of surfactants and short-chain alcohols are often achieved at a sacrifice to print quality.

Accordingly, a need exists for ink compositions for use in ink-jet printing that dry rapidly upon impact with the print medium and evidence reduced bleed. However, the print quality of the ink compositions must not be sacrificed to achieve faster dry times.

DISCLOSURE OF INVENTION

In accordance with the invention, the dry time of an ink-jet ink composition as printed on print media such as paper, transparency film, or textiles with an ink-jet printer is shortened by employing an ink containing a high-boiling, water-insoluble organic compound solubilized in an aqueous solution by an amphiphile. More particularly, the inks of the invention comprise (a) at least one dye; (b) at least one high boiling water-insoluble organic compound; (c) at least one amphiphile; and (d) water. As used herein, the term "high boiling organic compound" refers to an organic compound having a vapor pressure that is sufficiently low in comparison to that of water that only water evaporates from the ink during the normal operation of ink-jet printing. It is noted that this compound acts as both a solvent and a co-solvent.

The ink-jet inks formulated in accordance with the invention exhibit fast dry times and bleed control, while the degree of edge acuity achieved may be controlled by the choice of the amphiphile. More particularly, superior print quality in the form of good edge acuity is achieved in addition to fast dry times and bleed control by specifically employing a hydrotrope. Hydrotropes are a subset of the general class of amphiphiles and are characterized by their ability to solubilize water insoluble organic compounds such that the resulting isotropic solution occupies a relatively large area in the phase diagram and has a relatively high surface tension in comparison to that of solutions made by the use of surfactants. Typically, superior print quality is desired for printing onto a paper medium, such that one may preferentially employ a hydrotrope to solubilize the water insoluble organic compound. On the other hand, a lesser print quality may be acceptable in some applications, such as printing on textile media, such that one may employ surfactants to solubilize the water insoluble organic compound.

Notably, since the present ink vehicles contain both a water-insoluble compound and water, either water-soluble or water-insoluble dyes may be employed in the practice of the invention, although water-insoluble dyes may be preferred for their inherent waterfastness.

The inks of the invention may be used with a variety of ink-jet printers such as continuous, piezoelectric drop-on-demand printers and thermal or bubble jet drop-on-demand printers. The fast dry times and the printer-unaided bleed alleviation achieved in the practice of the invention enable ink-jet printers to increase their throughput, while the alleviation of bleed and the retention of good edge acuity contribute to high print quality.

BRIEF DESCRIPTION OF THE DRAWINGS

The sole FIGURE is a ternary phase diagram showing the composition region of use for ink-jet ink vehicles having a particular combination of solvent, amphiphile, and water.

BEST MODES FOR CARRYING OUT THE INVENTION

In the practice of the invention, the dry time exhibited by ink-jet ink compositions once printed on print media, such as paper, transparencies, or textiles, by an ink-jet printer is reduced by incorporating a high-boiling, water-insoluble organic compound as solubilized in aqueous solution by an amphiphile. More particularly, the present ink-jet ink compositions comprise (a) at least one dye; (b) at least one high boiling, water-insoluble organic compound; (c) at least one amphiphile; and (d) water. The amphiphile is present in an amount that completely solubilizes the organic compound, thereby resulting in a clear, stable ink solution.

All concentrations herein are in weight percent, unless otherwise indicated. The purity of all components is that employed in normal commercial practice for ink-jet inks.

Dyes that may be employed in the practice of the invention include both water-soluble and water-insoluble dyes. Any water-soluble or water-insoluble dye that is compatible with ink-jet printing may be suitably employed in the practice of the invention. Examples of water-soluble dyes that may be suitably employed in the practice of the invention include, but are not limited to, C.I. Acid Blue 9, C.I. Acid Red 18, C.I. Acid Red 27, C.I. Acid Red 52, C.I. Acid Yellow 23, and C.I. Direct Blue 199 and their monovalent alkali earth ions such as $Na^+$, $Li^+$, $Cs^+$, $NH_4^+$, and substituted ammonium salts. Examples of water-insoluble dyes that may be suitably employed in the practice of the invention include, but are in no way limited to, Isol Yellow, Isol Red, Isol Orange, Isol Black, and Solvent Blue B, all of which are commercially available from Crompton & Knowles (Charlotte, N.C.). The dye(s) is present from about 0.1 to 10 wt % of the ink composition.

The water-insoluble organic component serves several purposes in the practice of the invention. First, it serves as the co-solvent required for use with ink-jet pens. More particularly, when the pen of the ink-jet printer idles and is exposed to the atmosphere, the water in the ink vehicle evaporates. The presence of this high-boiling compound in the ink vehicle prevents crust formation and nozzle clogging. Hence, the vapor pressure of the organic compound should be sufficiently low in comparison to that of water that it does not evaporate during the normal operation of ink-jet printing. Second, this organic component serves as the primary solvent in the event a water-insoluble dye is selected in the practice of the invention.

Examples of organic compounds or oils that may be employed include, but are not limited to, water-insoluble mono- or polyglycol ethers; water-insoluble N-substituted 2-pyrrolidones; mono- or polyglycol esters; and water-insoluble hydrocarbons. In general, any water-insoluble organic compound, or combination thereof, that is capable of dissolving the selected dye and that is capable of being solubilized by an amphiphile may be employed in the practice of the invention. The water-insoluble organic compound may either be a liquid or a solid at room temperature. Specific examples of water-insoluble organic compounds that are preferably employed in the practice of the invention include, but are not limited to, monoethylene and polyethylene glycol phenyl ethers; monopropylene and polypropylene glycol phenyl ethers; and ethylene, propylene, polyethylene, and polypropylene glycol esters such as acrylates. The water-insoluble organic component may range in concentration from about 1 to 70 wt % of the ink-jet ink composition.

The amphiphile employed in the practice of the invention may be any amphiphile, or a combination thereof, that is compatible with the remaining components of the ink-jet ink composition and that is capable of "solubilizing" the high boiling water-insoluble organic compound in water. Amphiphiles solubilize the water-insoluble organic compound in water by breaking it into very small droplets and maintaining these droplets in a stable dispersion—a microemulsion. Surfactant examples of common non-hydrotropic amphiphiles include alkyl sulfonates, benzene sulfonates, alkyl substituted benzene sulfonates, naphthalene sulfonates, alkyl amine oxides, substituted ammonium salts and the non-ionics.

Preferably, the amphiphile employed in the practice of the invention is encompassed by a class of amphiphiles known as "hydrotropes". Hydrotropic amphiphiles, like amphiphiles and other surfactants in general, serve to solubilize the water-insoluble organic component in the ink composition. However, hydrotropic amphiphiles do not result in the precipitous drop in surface tension associated with the use of other surfactants, such that the reduction in surface tension for inks employing hydrotropic amphiphiles in the practice of the invention is curbed in comparison. Given that the comparatively lower surface tensions associated with inks containing surfactants are sometimes known to negatively impact drop ejection characteristics and print quality as described above, the use of hydrotropic amphiphiles is advantageous. Hydrotropic amphiphiles yield inks with faster dry times and improved bleed without the potential for puddling on the nozzle plate or the loss of edge acuity that sometimes plague surfactant-containing inks. However, in situations where edge acuity is not critical, such as textile printing, non-hydrotropic amphiphiles may be used. Hydrotropic amphiphiles are generally preferred where edge acuity is critical, such as printing on paper.

The hydrotropic amphiphile may be anionic, cationic, or non-ionic in nature. Examples of anionic hydrotropic amphiphiles suitably employed in the practice of the invention include, but are not limited to, sodium benzoate, sodium salicylate, sodium benzene sulfonate, sodium benzene disulfonate, sodium toluene sulfonate, sodium xylene sulfonate, sodium cumene sulfonate, sodium cymene sulfonate, and sodium cinnamate. Examples of cationic hydrotropic amphiphiles suitably employed in the practice of the invention include, but are not limited to, para amino benzoic acid hydrochloride, procaine hydrochloride, and caffeine. Examples of non-ionic hydrotropic amphiphiles suitably employed in the practice of the invention include, but are not limited to, resorcinol and pyrogallol.

Optionally, a co-surfactant may be added to the present ink-jet ink compositions. Such a co-surfactant preferably comprises a mid-chain alcohol, having from 3 to 8 carbon atoms, such as iso-propanol and pentanol. The co-surfactant may represent up to 10 wt % of the ink composition, either serving as a separate component or as a partial replacement for the amphiphile.

Consistent with the requirements for this invention, various types of additives may be employed in the ink to optimize the properties of the ink composition for specific applications. For example, as is well known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The ink compositions of the present invention may be prepared by two different methods, namely an abbreviated method and a more systematic method. To prepare the inks of the present invention in accordance with the abbreviated method, one must first combine the organic insoluble component(s) and the water in a ratio that reflects the required final composition of the ink. The resulting two-phase liquid is thereafter titrated with the selected amphiphile(s) until a clear solution is obtained, representing the solubilization of the organic compound such that a single-phase solution is achieved. About 1% excess amphiphile may optionally be added to ensure a stable solution. The selected dye, and any desired additives, are added to this single-phase solution to complete the formulation of the basic ink composition. Notably, once the appropriate relational concentrations of the organic component(s), water, and amphiphile(s) are determined through the above-described titration process, one may then mix subsequent ink compositions in any order.

In the event one chooses the more systematic approach to preparing the inks of the invention, the first step involves the construction of a phase diagram to represent the combination of the water-insoluble organic component and water. More specifically, a phase diagram is constructed by combining water and the high-boiling water-insoluble organic component(s) in various proportions, titrating each mixture against the amphiphile(s) until a clear, single-phase region is determined within the phase diagram. By further titrating beyond the clear point, other regions of multi-phase or semi-solid compositions can be determined. These results, when plotted on a conventional triangular plot, represent a ternary phase diagram. For example, the sole FIGURE depicts such a ternary phase diagram for an ink-jet ink composition comprising propylene glycol phenyl ether, sodium xylene sulfonate, and water, as described in greater detail in the examples below, wherein Area A represents a milky region having two phases, Area B represents a single-phase isotropic region, and Area C represents a semi-solid region. The single-phase isotropic region (Area B) indicates compositions of organic component(s), water, and amphiphile(s) that are more suitable for use in an ink-jet ink composition. Thus, one may select any composition from this single-phase region in the practice of the invention, provided the composition meets any other criteria for the particular ink-jet ink composition.

It should be noted that compositions within Area A may be employed in those applications not requiring a long shelf life, such as textile printing. Likewise, use of a heated print cartridge could permit compositions within Area C to be employed.

An ink prepared in accordance with the invention will exhibit fast dry times and bleed control expected of inks containing a surfactant component, but will not likewise exhibit the decline in print quality generally associated therewith, especially if a hydrotropic amphiphile is employed. The examples below demonstrate the speed with which ink-jet ink compositions prepared in accordance with the invention dry upon printing by an ink-jet printer.

EXAMPLES

Two inks were prepared in accordance with the invention as follows:

Example 1

An ink-jet ink composition was prepared consisting of 3 wt % Isol Yellow dye, 25 wt % propylene glycol phenyl ether, 15 wt % sodium xylene sulfonate, and the remainder water, with the concentrations of the vehicle components having been determined by constructing the phase diagram depicted in the sole FIGURE. More specifically, the phase diagram depicted in the FIGURE was constructed by combining propylene glycol phenyl ether and water in various proportions and then titrating each mixture against sodium xylene sulfonate until a clear, single-phase region was determined. Thus, Area A of the FIGURE represents the various combinations of propylene glycol phenyl ether, sodium xylene sulfonate, and water that yielded a two-phase region evidenced by a milky appearance. Area B of the FIGURE represents the various combinations of propylene glycol phenyl ether, sodium xylene sulfonate, and water that yielded a clear, single-phase region. Area C of the FIGURE was defined by further titrating the mixtures of propylene glycol phenyl ether and water with sodium xylene sulfonate beyond the clear point until a semi-solid phase region was defined. The single-phase isotropic region Area B of the FIGURE indicates compositions of propylene glycol phenyl ether, sodium xylene sulfonate, and water that may be suitably employed in the practice of the invention. The compositions indicated by Areas A and C represent ink vehicles outside of the scope of the invention.

The ink-jet ink composition of this example falls within the single-phase isotropic region of Area B in the FIGURE. More specifically, the vehicle of this ink composition contained 26 wt % propylene glycol phenyl ether, 15 wt % sodium xylene sulfonate, and 59 wt % water, with the concentrations slightly changed to represent percentage of ink vehicle rather than total ink composition. Point D on the FIGURE indicates that the vehicle of this example ink composition indeed falls within the clear single-phase region Area B of the ternary phase diagram.

The ink-jet ink composition of this example was printed on plain paper using a 45 picoliter drop volume pen. The ink dried instantaneously upon impact with plain paper. In comparison, it is known that ink-jet ink compositions having a water-soluble co-solvent (see, e.g., U.S. Pat. No. 4,963,189 entitled "Waterfast Ink Formulations with a Novel Series of Anionic Dyes Containing Two or More Carboxyl Groups", issued to Suraj Hindagolla et al and assigned to the same assignee as the present application) exhibit a finite, readily-measurable dry time when printed on plain paper.

Example 2

An ink-jet ink composition was prepared consisting of 3 wt % Isol Yellow dye, 25 wt % ethylene glycol phenyl ether, 11 wt % sodium xylene sulfonate, and the remainder water, it having been determined through an exercise similar to that of Example 1 that such a vehicle would be a single-phase liquid. This ink-jet ink composition was then primed on plain paper using a 45 picoliter drop volume pen. The ink dried instantaneously upon impact with the plain paper.

Thus, it has been demonstrated that ink-jet ink compositions made in accordance with the invention exhibit fast dry times upon printing by an ink-jet printer.

INDUSTRIAL APPLICABILITY

The present ink-jet ink compositions and method for making the same as disclosed herein are expected to find commercial use in ink-jet black and color printing.

Thus, there has been disclosed an ink composition that may be employed to achieve fast dry times and bleed control without sacrificing print quality. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An aqueous ink-jet ink composition with improved dry time and reduced bleed, said aqueous ink-jet ink composition comprising:
   (a) at least one dye;
   (b) at least one water-insoluble organic compound;
   (c) at least one amphiphile; and
   (d) water,
wherein said amphiphile is present in an amount sufficient to solubilize said at least one water-insoluble organic compound in said water.

2. The aqueous ink-jet ink composition of claim 1 wherein said at least one dye is present in said ink-jet ink composition in an amount ranging from about 0.1 to 10 wt %.

3. The aqueous ink-jet ink composition of claim 1 wherein said at least one water-insoluble organic compound is selected from the group consisting of water-insoluble monoglycol ethers, water-insoluble polyglycol ethers, water-insoluble N-substituted 2-pyrrolidones, water-insoluble monoglycol esters, water-insoluble polyglycol esters, and water insoluble hydrocarbons.

4. The aqueous ink-jet ink composition of claim 3 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, and polypropylene glycol esters.

5. The aqueous ink-jet ink composition of claim 1 wherein said at least one water-insoluble organic compound is present in said ink-jet ink composition in an amount ranging from about 1 to 70 wt %.

6. The aqueous ink-jet ink composition of claim 1 wherein said at least one amphiphile is a hydrotropic amphiphile.

7. The aqueous ink-jet ink composition of claim 6 wherein said hydrotropic amphiphile is selected from the group consisting of sodium benzoate, sodium salicylate, sodium benzene sulfonate, sodium benzene disulfonate, sodium toluene sulfonate, sodium xylene sulfonate, sodium cumene sulfonate, sodium cymene sulfonate, sodium cinnamate, para amino benzoic acid hydrochloride, procaine hydrochloride, caffeine, resorcinol and pyrogallol.

8. The aqueous ink-jet ink composition of claim 1 wherein said at least one water-insoluble organic compound is selected from the group consisting of propylene glycol phenyl ether and ethylene glycol phenyl ether and said at least one amphiphile is sodium xylene sulfonate.

9. The aqueous ink-jet ink composition of claim 1 further comprising a co-surfactant comprising an alcohol having a carbon chain length ranging from three to eight carbon atoms in length, said alcohol having a concentration within the range of 0 to about 10 wt % of said aqueous ink-jet ink composition.

10. The aqueous ink-jet ink composition of claim 1 wherein said aqueous ink-jet ink comprises:
   (a) about 0.1 to 10 wt % of at least one water-insoluble dye;
   (b) about 1 to 70 wt % of at least one water-insoluble organic compound selected from the group consisting of propylene glycol phenyl ether and ethylene glycol phenyl ether;
   (c) sodium xylene sulfonate; and
   (d) water,
wherein said sodium xylene sulfonate is present in an amount sufficient to solubilize said at least one water-insoluble organic compound in said water.

11. A process for reducing dry times in inks employed in ink-jet printing, comprising
   (a) formulating an ink-jet ink composition comprising
      (i) at least one dye,
      (ii) at least one water-insoluble organic compound,
      (iii) at least one amphiphile, and
      (iv) water,
wherein said amphiphile is present in an amount sufficient to solubilize said at least one water-insoluble organic compound in said water; and
   (b) printing said ink-jet ink composition on a print medium by means of an ink-jet pen, whereby said ink-jet ink composition dries essentially instantaneously upon impact with said print medium.

12. The process of claim 11 wherein said at least one dye is present in said ink-jet ink composition in an amount ranging from about 0.1 to 10 wt %.

13. The process of claim 11 wherein said at least one water-insoluble organic compound is selected from the group consisting of water-insoluble monoglycol ethers, water-insoluble polyglycol ethers, water-insoluble N-substituted 2-pyrrolidones, water-insoluble monoglycol esters, water-insoluble polyglycol esters, and water-insoluble hydrocarbons.

14. The process of claim 13 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, and polypropylene glycol esters.

15. The process of claim 11 wherein said at least one water-insoluble organic compound is present in said ink-jet ink composition in an amount ranging from about 1 to 70 wt %.

16. The process of claim 11 wherein said at least one amphiphile is a hydrotropic amphiphile.

17. The process of claim 16 wherein said hydrotropic amphiphile is selected from the group consisting of sodium benzoate, sodium salicylate, sodium benzene sulfonate, sodium benzene disulfonate, sodium toluene sulfonate, sodium xylene sulfonate, sodium cumene sulfonate, sodium cymene sulfonate, sodium cinnamate, para amino benzoic acid hydrochloride, procaine hydrochloride, caffeine, resorcinol and pyrogallol.

18. The process of claim 11 wherein said at least one water-insoluble organic compound is selected from the group consisting of propylene glycol phenyl ether and ethylene glycol phenyl ether and said at least one amphiphile is sodium xylene sulfonate.

19. The process of claim 11 wherein said ink-jet ink composition is formulated to comprise:
   (a) about 0.1 to 10 wt % of at least one water-insoluble dye;
   (b) about 1 to 70 wt % of at least one water-insoluble organic compound selected from the group consisting of propylene glycol phenyl ether and ethylene glycol phenyl ether;
   (c) sodium xylene sulfonate; and
   (d) water, wherein said sodium xylene sulfonate is present in an amount sufficient to solubilize said at least one water-insoluble organic compound in said water.

20. The process of claim 11 wherein said ink-jet ink composition further comprises a co-surfactant comprising an alcohol having a carbon chain length ranging from three to eight carbon atoms in length, said alcohol having a concentration within the range of 0 to about 10 wt % of said ink-jet ink composition.

* * * * *